United States Patent Office 2,776,285
Patented Jan. 1, 1957

2,776,285

PRODUCTION OF MELAMINE

Colver P. Dyer, Winchester, Mass., assignor to Monsanto Chemical Company, St. Louis, Mo., a corporation of Delaware No Drawing. Application September 26, 1955,
Serial No. 536,749

9 Claims. (Cl. 260—249.7)

The present invention relates to the preparation of melamine, and more particularly to a continuous process of producing melamine.

It has been proposed heretofore to pump urea into one end of a reaction tube at elevated temperatures and at superatmospheric pressure, either with or without anhydrous ammonia, and withdraw melamine from the other end of the tube. The urea is converted into various water-insoluble intermediate products at temperatures above about 300° C. and these intermediate products eventually form melamine as they travel through the reaction tube. In such a process the urea is not in contact with the melamine finally formed because it is converted to various intermediate products together with ammonia and carbon dioxide before the melamine is formed. This process is very difficult to operate because the insoluble intermediate products initially formed from the urea plug up the reaction tube unless the operating conditions of temperature, retention time in the tube and pressure are properly adjusted and maintained within narrow limits. The proper operating conditions are difficult to maintain on a commercial scale. Not only is plugging of the reaction tube a problem in the process described above, but corrosion of the reaction tube is also a problem in the operation of the process. In view of the difficulties encountered with the process described above, there has been a long felt need in the art for a simple and efficient process of producing melamine from urea continuously with a minimum of operating difficulties.

It is accordingly one object of this invention to provide a simple and improved process of producing melamine continuously from urea or other melamine-forming substances.

It is a further object of this invention to provide a process of producing melamine continuously from urea in a non-precious metal reaction vessel while minimizing or eliminating plugging or corrosion difficulties.

Still further objects and advantages of this invention will appear in the following description and the appended claims.

These and other objects of this invention are attained, in general, by continuously injecting molten urea into a substantial excess of molten melamine in a non-precious metal, pressure-resistant vessel at a superatmospheric pressure sufficient to prevent appreciable vaporization and deamination of the molten melamine, to form a suspension of molten urea in molten melamine, in which suspension the molten urea and intermediate products derived therefrom are out of contact with the walls of such vessel until the urea and intermediate products are converted to molten melamine and gaseous by-products in such vessel, while maintaining the temperature of such suspension above the melting point of the melamine, continuously removing molten melamine from such vessel at a rate sufficient to maintain in such vessel a substantial excess of molten melamine in relation to the amount of molten urea injected therein and maintaining the pressure on the molten melamine in such vessel at least at a pressure sufficient to prevent appreciable vaporization and deamination of the molten melamine by controlling the amount of gaseous by-products released.

The above process is preferably carried out in the presence of a small amount of a melamine catalyst in order to speed up the rate of conversion of urea to melamine. As examples of catalysts may be mentioned strong mineral acids such as sulfuric acid, phosphoric acid and hydrochloric acid or salts or anhydrides of such acids. Either inorganic or organic salts of such acids may be used, for example, ammonium or guanidine salts. Various forms of phosphoric acid, such as meta- and pyrophosphoric acids, their salts and anhydrides may be used. It is preferred to use an ammonium salt of a strong mineral acid, and more preferably an ammonium salt of phosphoric acid, or phosphoric anhydride. The amount of such catalyst may be varied to some extent, for example, it is possible to use from about 0.001 to 5% by weight of catalyst based on the total mass in the reaction vessel. However, it is preferred to use from about 0.001 to 2% of the catalyst based on the total mass in the reaction vessel, or based on the weight of melamine and urea or its intermediate products in the reaction vessel or zone.

The mechanism of the conversion of molten urea to molten melamine under the conditions of this invention is not completely understood. However, it is believed that the urea is first converted to various solid water-insoluble intermediate products including products such as cyanuric acid, ammeline and ammelide, together with ammonia and carbon dioxide, and that these intermediate products are amidated to melamine at the temperature of molten melamine by the ammonia formed from the urea. It is also believed that these intermediate products are the cause of plugging and corrosion of reaction vessels or reaction tubes. Due to the substantial excess of molten melamine in the reaction zone the water-insoluble intermediate products which are formed in situ, remain suspended in the molten melamine until they are amidated to melamine, and thus have no tendency to contact the walls of the reaction tube or autoclave. Accordingly, there is little or no tendency of the solid intermediate products to cause plugging or corrosion in the processes of this invention. It is to be understood, however, that the above mechanism of conversion is given by way of explanation and it is not intended to limit this invention to such theory. The fact remains that plugging and corrosion problems heretofore encountered are materially minimized or eliminated by the processes described herein.

In carrying out the process of this invention, the molten urea is added to the molten melamine in the pressure-resistant vessel which provides a reaction zone and is capable of withstanding the operating pressures employed. For example, the molten urea, may be added to a vertical or vertically inclined reaction tube or vessel which is closed at the top and bottom, and which contains the molten melamine. The reaction tube may contain varying amounts of molten melamine but there should be sufficient free space above the molten melamine in the tube to permit some of the gases formed in the molten melamine during the conversion of the urea to melamine to escape from the molten melamine to the free space in the reaction tube. The molten urea is pumped into the reaction tube through a suitable pipe or pipes, which may be lagged if necessary. The urea pipe may be provided with a nozzle or nozzles to inject the molten urea into the molten melamine at a relatively high velocity in order to obtain intimate mixing of the urea and melamine. The molten melamine is withdrawn from the tube in the liquid state through a suitable lagged or heated pipe which is maintained at a temperature above the melting point of the melamine. The melamine withdrawal pipe should be below the surface of the molten melamine in the reaction tube and the level of the molten melamine in the tube should be maintained above the point at which the molten melamine is removed. The melamine withdrawal pipe is provided with a heated valve to control the rate of removal of molten melamine from the reaction tube. The reaction tube is also provided with a venting means which communicates with the free space above the molten melamine to permit removal of gases from the free space in the reaction tube. Control of the pressure above the molten melamine is thus assured. The venting means suitably comprises a lagged pipe which communicates with the free space above the molten melamine, and this pipe is provided with a valve to control the rate of removal of gases. The vented gases may be purified to recover ammonia and carbon dioxide. These gases may be used to prepare urea.

Small or large autoclaves may also be used instead of a reaction tube providing they are large enough to hold a substantial excess of molten melamine in relation to the urea added, and are not too large to be maintained at the operating temperatures and pressures.

The reaction tubes or autoclaves used may be heated in any suitable manner. For example they may be jacketed and heated by circulating a high temperature fluid medium such as diphenyl, molten sodium nitrate or the like through the jacket. When the reaction tubes or autoclaves are sufficiently large they may be jacketed and also provided with internal coils for heating the molten melamine and maintaining the melamine in a molten or liquid state. The reaction tube or autoclave may also be heated electrically.

When the reaction tube or autoclave is sufficiently large it may also be provided with an agitating device to stir the molten melamine therein.

The reaction tube, autoclave or vessel is constructed of any suitable non-precious metal which is capable of withstanding the pressures employed and is corroded by urea and intermediate products derived from urea at temperatures above the melting point of melamine but is resistant to corrosion by molten melamine. Thus, it may be constructed of steel lined with stainless steel on those surfaces exposed to the molten melamine or it may be constructed entirely of stainless steel. Moreover, other parts of the apparatus used are preferably constructed of such materials. One of the advantages of the present invention over the prior process hereinbefore described is the fact that it is possible to carry out the present process in stainless steel reaction tubes or autoclaves without serious corrosion problems whereas stainless steel reaction tubes give serious corrosion problems with such prior process.

In operating the present process, the pressure-resistant reaction tube or autoclave is first partially filled with molten melamine and heat is supplied to maintain the melamine in the molten state, or it may be partially filled with solid melamine which is melted by heating the tube or autoclave to a temperature above 360° C. In either case sufficient anhydrous ammonia is also introduced with the melamine to prevent decomposition of the melamine and to provide a sufficient vapor pressure above the molten melamine to maintain the melamine substantially in the liquid state, that is, the amount of anhydrous ammonia added should be sufficient to prevent appreciable vaporization and deamination of the melamine. Molten urea below its decomposition temperature, preferably at a temperature of 140° C. to 275° C., is then added to the molten melamine in the reaction vessel, tube or autoclave. This is suitably accomplished by pumping the molten urea directly into the molten melamine, that is, injecting the molten urea into the molten melamine. The urea used is free or substantially free of decomposition products or intermediate products, and it is maintained in this state at the temperatures of 140–275° C. by maintaining a pressure of about 15 to 1000 pounds per square inch (gauge) on the urea, with the lower pressures corresponding to the lower temperatures. In order to avoid operating difficulties, it is necessary to pump or inject the urea into the molten melamine at a rate sufficient to prevent conversion of the urea to intermediate products or melamine in the molten urea supply line or pipe, that is, it is necessary to supply the molten urea at such a rate that substantially only unconverted or undecomposed molten urea is supplied to the molten melamine.

After the continuous addition of molten urea is begun there is no need to add ammonia to the molten melamine to maintain the pressure in the reaction zone and to prevent decomposition of the molten melamine, since ammonia and carbon dioxide are formed during the conversion of urea to melamine, and these gases not only are evolved in amounts sufficient to maintain the desired pressure, but also are evolved in amounts sufficient to substantially prevent decomposition of the melamine under the conditions of operation.

The molten melamine present in the reaction zone should be substantially in excess of the urea added at any increment of time, and in such excess that the urea or the intermediate products obtained therefrom at the temperature employed are dispersed in the molten melamine and remain substantially dispersed therein during the period of time required to convert the urea, and its intermediate products, to molten melamine, which normally requires less than about 45 seconds. In general, the amount of urea or its intermediate products present in the molten melamine at any increment of time should not exceed about 20% by weight of the total mass in the operating zone, and it is preferred not to have more than 10% by weight of urea or its intermediate products, based on the total mass in the reaction zone, present in the molten melamine at any increment of time. The minimum amount of urea used is normally such as to provide at least 1%, preferably at least 2%, by weight of urea based on the reaction mass in the reaction vessel.

The foregoing is accomplished by adding molten urea to the molten melamine and withdrawing melamine from the reaction zone at such a rate that the above described concentrations of urea or its intermediate products to melamine are obtained. In other words, the molten urea is added to the molten melamine at such a rate that the amounts of urea or its intermediate products present in the molten melamine are within the general limits defined above and the liquid or molten melamine is withdrawn from the reaction zone at a rate sufficient to maintain a substantial excess of the molten melamine in the reaction zone relative to the amount of urea added or relative to the intermediate products formed from such urea.

As is pointed out previously herein, the process of this invention is carried out by maintaining the melamine in the molten state, that is, above the temperature at which crystal formation or solidification of the melamine occurs. It is generally desirable to maintain the molten melamine at a temperature above 370° C. The process may be carried out at any temperature above this at which the melamine does not decompose, but not as high as the critical temperature of melamine. For example, it is possible to operate the process at temperatures as high as 550° C. The particular temperature used will depend on the pressure in the reaction zone as will be more fully discussed hereinafter. The rate of conversion of urea or its intermediate products to melamine increases with increased temperatures. This means that the rate of production of melamine from urea is increased, and the rate of urea which may be added to the molten melamine may be increased at higher operating temperatures. However, if the temperature employed is too high there is a tendency for the melamine to decompose and the process becomes more expensive to operate. It is preferred to operate the process by maintaining the molten melamine in the reaction zone at a temperature between about 400 and 500° C. This is suitably accomplished by supplying heat to the molten melamine in the reaction tube or autoclave as required.

The pressure in the reaction vessel or zone is dependent on the temperature of the molten melamine. As is pointed out previously herein, the pressure in the reaction zone should be maintained sufficiently high to prevent appreciable vaporization and deamination of melamine from the heel or pool of molten melamine present in the reaction zone. At lower temperatures, that is, at temperatures close to the crystallizing point of the molten melamine the pressure in the reaction zone may be maintained as low as 700 pounds per square inch absolute pressure without appreciable vaporization and deamination of the melamine. At higher temperatures it is necessary to use a higher operating pressure in order to maintain the molten melamine substantially in the liquid state, that is, prevent appreciable vaporization and deamination thereof. Thus, at temperatures of 550° C. or higher it is desirable to operate at pressures as high as 5000 to 10,000 pounds per square inch absolute pressure. There is no limit to the maximum operating pressure which may be used except the limits imposed by the strength of the reaction tubes or autoclave used. The pressure in the reaction vessel or zone is controlled by regulating the quantity of gas which collects above the molten melamine in the reaction tube or autoclave. These gases, which consist primarily of carbon dioxide and ammonia, are released at such a rate that the proper operating pressure is maintained in the reaction vessel or zone. This does not mean that the pressure is maintained constant because it is possible to release the gases at such a rate that the pressure in the reaction zone increases or decreases. It is only necessary that the pressure be kept sufficiently high to prevent appreciable vaporization and deamination of the melamine in the reaction vessel or zone.

A further understanding of the processes of this invention will be obtained from the following specific examples which are intended to illustrate the invention, but not to limit the scope thereof, parts and percentages being by weight unless otherwise specified.

*Example I*

The process described below was carried out in a vertical cylindrical stainless steel autoclave having an internal diameter of 12 inches and an overall height of 10 feet. The autoclave was jacketed and provided with internal stainless steel coils. Molten sodium nitrate was circulated through the jacket and coils of the autoclave as a source of heat for heating melamine in the autoclave. Four hundred parts of melamine and one hundred parts of anhydrous ammonia were charged to the closed autoclave and the autoclave was heated until the temperature of the melamine was 450° C. Ammonia gas was bled off in an amount sufficient to maintain the pressure in the free space above the melamine at 3500 pounds per square inch absolute pressure. Molten urea at a temperature of 200° C. was pumped into the autoclave continuously through 4 stainless steel jets located in the bottom of the autoclave, each jet being located in the center of each quadrant of the bottom of the autoclave and projecting into the autoclave about 1.5 feet above the bottom of the autoclave. The total amount of molten urea pumped into the autoclave per unit of time was 29.6 parts per minute. The temperature of the molten urea leaving the jets and entering the molten melamine in the autoclave was below 270° C., which is below the decomposition temperature of urea. On entering the molten melamine in the autoclave, the molten urea was converted to various intermediate products and finally to melamine within a period of 45 seconds. Ammonia and carbon dioxide were evolved and bubbled up through the molten melamine thereby agitating the mixture in the autoclave.

Molten melamine was continuously withdrawn from the autoclave through a lagged pipe which was about 5 feet above the bottom of the autoclave. The rate of withdrawal of molten melamine was adjusted to maintain the molten melamine in the autoclave at a constant level at about 7 feet from the bottom of the autoclave thus providing about 3 feet of free space above the molten melamine. This rate of withdrawal was approximately 10 parts of molten melamine per minute. The molten melamine thus withdrawn was pumped to a heat exchanger where it was heated to 500° C. at a pressure of 1000 pounds per square inch and vaporized. The vapors of melamine were then released to the atmosphere through a hot let-down valve thereby condensing the melamine as a solid. The pressure in the autoclave was maintained at 3500 pounds per square inch by bleeding off gas from the free space above the molten melamine in the autoclave. No appreciable corrosion of the apparatus was noted.

*Example II*

Melamine was prepared continuously from urea using the same procedure described in Example I except that 0.05% of diammonium hydrogen phosphate, based on the melamine and urea in the autoclave, was used as a catalyst. The rate of conversion of the urea to melamine was faster than in the procedure of Example I. This indicates that the urea may be fed more rapidly to give a higher rate of production to melamine than is the case when the catalyst is omitted.

Although the processes of this invention are especially suitable for preparing melamine from molten urea because they minimize the problems of plugging and corrosion heretofore experienced when using urea as the precursor of melamine, the process of this invention may also be used to prepare melamine from other melamine-forming substances or melamine precursors which form corrosive intermediate products similar to those formed from urea.

This application is a continuation-in-part of my copending application Serial No. 264,283, filed December 29, 1951.

What is claimed is:

1. A continuous process of producing melamine which comprises continuously injecting molten urea into molten melamine which is at a temperature between about 370 and 550° C. in a pressure-resistant stainless steel vessel at a pressure between about 700 and 10,000 pounds per square inch, with the lower pressures corresponding to the lower temperatures of the molten melamine, said molten urea being injected at a rate sufficient to form a suspension thereof in the molten melamine in which suspension the molten urea is out of contact with the walls of said vessel and does not exceed 20% by weight of the total mass in said vessel, continuously maintaining said molten urea and intermediate products formed therefrom suspended in said molten melamine and out of contact with the walls of said vessel until said urea and intermediate products are converted to melamine and gaseous by-products, continuously removing a portion of the molten melamine from said vessel while retaining in said vessel a suspension of molten urea in molten melamine in which suspension the molten urea and intermediate products derived from urea do not exceed 20% by weight of the total mass in said vessel, and continuously maintaining the pressure in said vessel between about 700 and 10,000 pounds per square inch, with the lower pressures corresponding to the lower temperatures of the molten melamine, by controlling the amount of gaseous products released from said vessel.

2. A process according to claim 1, but further characterized in that the conversion of urea to melamine is carried out in the presence of a small amount of phosphoric anhydride.

3. A process according to claim 1, but further characterized in that the conversion of urea to melamine is carried out in the presence of an ammonium salt of a strong mineral acid.

4. A process according to claim 3, but further characterized in that the ammonium salt is an ammonium salt of phosphoric acid.

5. A process according to claim 1, but further characterized in that the molten melamine continuously removed from the vessel is removed at substantially the same rate as molten melamine is formed in the vessel.

6. A continuous process of producing melamine which comprises continuously injecting molten urea into molten melamine which is at a temperature between about 370 and 550° C. in a pressure-resistant stainless steel vessel under a pressure between about 700 and 10,000 pounds per square inch, with the lower pressures corresponding to the lower temperatures of the molten melamine, said molten urea being injected at a rate sufficient to form a suspension thereof in the molten melamine in which suspension the molten urea is out of contact with the walls of said vessel and does not exceed 10% by weight of the total mass in said vessel, continuously maintaining said molten urea and intermediate products formed therefrom suspended in said molten melamine and out of contact with the walls of said vessel until said urea and intermediate products are converted to melamine and gaseous by-products, continuously removing a portion of the molten melamine from said vessel while retaining in said vessel a suspension of molten urea and intermediate products derived therefrom in molten melamine which suspension contains less than 10% by weight of said urea and intermediate products, based on the total mass in said vessel, and continuously maintaining the pressures in said vessel between about 700 and 10,000 pounds per square inch, with the lower pressures corresponding to the lower temperatures of the molten melamine, by controlling the amount of gaseous products released from said vessel.

7. A process according to claim 6, but further characterized in that the conversion of urea to melamine is carried out in the presence of a small amount of phosphoric anhydride.

8. A process according to claim 6, but further characterized in that the conversion of urea to melamine is carried out in the presence of a small amount of an ammonium salt of a strong mineral acid.

9. A continuous process of producing melamine which comprises continuously injecting molten urea into molten melamine in a pressure-resistant stainless steel vessel under a pressure between about 700 and 10,000 pounds per square inch, said molten urea being injected into the bottom portion of said vessel in an amount of at least 1% but not exceeding 10% by weight of the total mass in said vessel to form a suspension of molten urea in said melamine in which suspension said urea is out of contact with the walls of said vessel, continuously heating the mass in said vessel to maintain the temperature of the molten melamine therein between about 370 and 550° C., continuously maintaining said molten urea and intermediate products derived therefrom suspended in the molten melamine and out of contact with the walls of said vessel until said urea and intermediate products are converted to melamine and gaseous by-products, continuously removing molten melamine from said vessel at substantially the same rate at which melamine is formed in said vessel and continuously maintaining the pressure in said vessel between about 700 and 10,000 pounds per square inch, with the lower pressures corresponding to the lower temperatures of the molten melamine, by controlling the amount of gaseous products released from said vessel.

References Cited in the file of this patent

UNITED STATES PATENTS

| | | |
|---|---|---|
| 2,566,224 | MacKay | Aug. 28, 1951 |
| 2,566,229 | MacKay | Aug. 28, 1951 |

FOREIGN PATENTS

| | | |
|---|---|---|
| 583,504 | Great Britain | Dec. 1946 |